(12) United States Patent
Jones

(10) Patent No.: US 8,641,855 B2
(45) Date of Patent: Feb. 4, 2014

(54) METHOD FOR SPACING ELECTRICAL CONDUCTORS AND RELATED DEVICES

(75) Inventor: William F. Jones, York, SC (US)

(73) Assignee: Siemens Energy, Inc., Orlando, FL (US)

( * ) Notice: Subject to any disclaimer, the term of this patent is extended or adjusted under 35 U.S.C. 154(b) by 1266 days.

(21) Appl. No.: 12/188,553

(22) Filed: Aug. 8, 2008

(65) Prior Publication Data

US 2009/0079290 A1 Mar. 26, 2009

Related U.S. Application Data

(60) Provisional application No. 60/975,047, filed on Sep. 25, 2007.

(51) Int. Cl.
*H02K 15/10* (2006.01)

(52) U.S. Cl.
USPC ....................................................... 156/272.2

(58) Field of Classification Search
USPC ............. 156/272.2, 272.4, 273.1, 275.5, 184; 29/596; 174/52.1; 310/214, 215
See application file for complete search history.

(56) References Cited

U.S. PATENT DOCUMENTS

| | | | |
|---|---|---|---|
| 3,052,650 A * | 9/1962 | Wear et al. | 528/93 |
| 3,489,695 A | 1/1970 | Green | |
| 3,949,256 A * | 4/1976 | Cooper et al. | 310/260 |
| 4,128,777 A | 12/1978 | Zgraggen | |
| 4,808,873 A * | 2/1989 | Rowe et al. | 310/260 |
| 5,381,944 A | 1/1995 | Makowiecki et al. | |
| 6,534,192 B1 | 3/2003 | Abys et al. | |
| 6,534,194 B2 | 3/2003 | Weihs et al. | |
| 6,736,942 B2 | 5/2004 | Weihs et al. | |
| 6,863,992 B2 | 3/2005 | Weihs et al. | |
| 6,991,855 B2 | 1/2006 | Weihs et al. | |
| 6,991,856 B2 | 1/2006 | Weihs et al. | |
| 7,143,568 B2 | 12/2006 | Van Heerden et al. | |
| 2002/0182436 A1* | 12/2002 | Weihs et al. | 428/635 |
| 2005/0142495 A1* | 6/2005 | Van Heerden et al. | 430/311 |

FOREIGN PATENT DOCUMENTS

| | | |
|---|---|---|
| EP | 1610445 A1 | 12/2005 |
| JP | 56091655 A | 7/1981 |
| JP | 60216749 A | 10/1985 |
| JP | 01204982 A * | 8/1989 |

* cited by examiner

*Primary Examiner* — Daniel McNally

(57) ABSTRACT

A method of spacing a plurality of electrical conductors for carrying electrical current in an electrical machine may include positioning between the electrical conductors an uncured spacer body. The uncured spacer body may include a curable material, and an activatable heat generating material mixed with the curable material. The method may further include activating the activatable heat generating material to heat the curable material to form a cured spacer to thereby space the electrical conductors in the electrical machine.

13 Claims, 5 Drawing Sheets

METHOD FOR SPACING ELECTRICAL CONDUCTORS AND RELATED DEVICES

RELATED APPLICATIONS

The present application is based on provisional application Ser. No. 60/975,047, filed Sep. 25, 2007, the entire contents of which are incorporated by reference.

FIELD OF THE INVENTION

The present invention relates to electrical machines, and, more particularly, to spacing electrical conductors for carrying current in an electrical machine, and associated devices.

BACKGROUND OF THE INVENTION

An example of relatively large electrical machinery is an electrical generator driven by a turbine in a power generating plant. The electrical generator generally includes a rotor, and a stator surrounding the rotor. Stator windings or coils extend outwardly to the ends of the stator. Adjacent stator windings or coils are held in place by a spacer between adjacent spacer coils and felt and glass banding. Similarly adjacent rotor coils may also be held in place by a spacer between adjacent rotor coils and felt and glass banding.

A coil spacer may include an epoxy or adhesive coated spacer between adjacent stator windings or coils. Similarly, the glass and felt banding may be epoxy or adhesive coated. To advance the cure and/or improve the properties of the epoxy resin or adhesive, externally provided heat may be applied to the spacer and banding.

Current methods for curing epoxy materials or adhesives are to allow them to react naturally at an ambient temperature. Alternatively, there is an option of heating the material with an external source that causes the reactions to occur. Once cured, the degree, or amount, of curing can be advanced by additional heating. As the cure is advanced closer to the theoretical 100% point, mechanical properties of the epoxy or adhesive may improve significantly.

The configuration of an electrical generator generally requires that, to facilitate the curing of stator winding or coil spacers, the electrical generator be placed inside a large industrial-sized oven. Other external localized heating systems may also be used. However, such techniques may be time-consuming and may require large areas and specialized equipment to move the electrical generator and provide the external heat.

SUMMARY OF THE INVENTION

In view of the foregoing background, it is therefore an object of the present invention to provide a method of spacing electrical conductors for carrying current in an electrical machine and related devices.

This and other objects, features, and advantages in accordance with the present invention are provided by a method of spacing a plurality of electrical conductors for carrying current in an electrical machine, including positioning between the electrical conductors an uncured spacer body comprising a curable material, and an activatable heat generating material mixed with the curable material. The method may also include activating the activatable heat generating material to heat the curable material to form a cured spacer to thereby space the adjacent stator coils in the electrical machine. Accordingly, the method may provide a more fully cured spacer without the need for an oven or other localized heating system.

The activatable heat generating material may be activatable by an applied electric field, and activating may include applying an electric field to the activatable heat generating material. In some embodiments the activatable heat generating material may be activatable by an applied magnetic field, and activating may include applying a magnetic field to the activatable heat generating material, for example.

The activatable heat generating material may be a multilayer reactive foil, for example. The curable material may include an epoxy resin. The uncured spaced body may further include a core within the curable material and activatable heat generating material, for example. The method may further include wrapping the uncured spacer body between adjacent ones of the plurality of stator coils prior to activating.

Another aspect is directed to an electrical machine that may include a plurality of electrical conductors for carrying current, and an insulating spacer between adjacent ones of the electrical conductor. Moreover, the insulating spacer may include a cured material, and metal portions mixed within the cured material. An insulating banding may also be around the adjacent ones of the electrical conductors and the insulating spacer.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
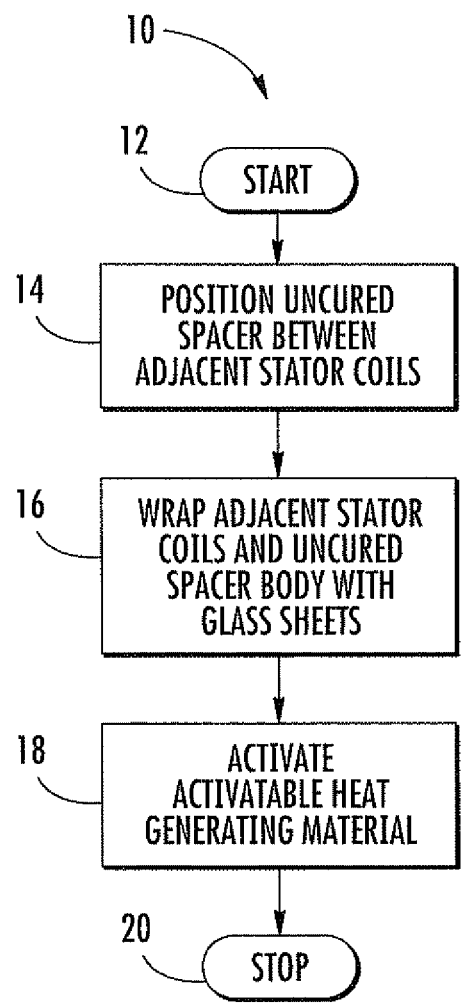
FIG. 1 is a flowchart illustrating a method of spacing a plurality of electrical conductors in the form of adjacent stator coils in an electrical machine in accordance with the present invention.
Figure 2:
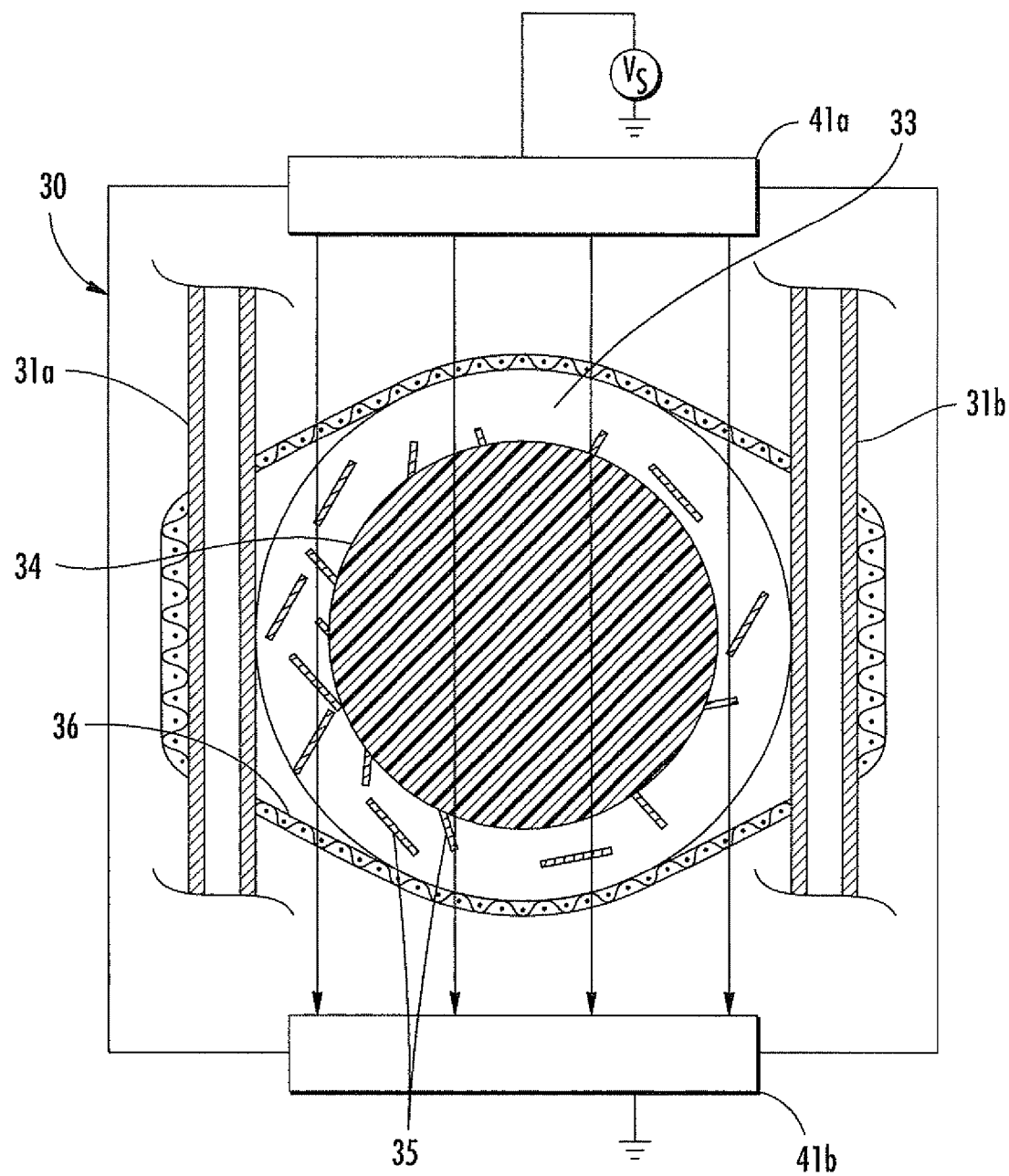
FIG. 2 is a schematic cross-sectional view of a portion of an electrical machine including an uncured spacer body and associated banding for spacing in accordance with one embodiment of the method of FIG. 1.

Referring initially to FIGS. 1-2, a method of spacing adjacent stator coils 31*a*, 31*b* in an electrical machine 30 (FIG. 2) is now described with reference to the flowchart 10 (FIG. 1). In other embodiments, the method may be of spacing adjacent rotor coils in an electrical machine or bracing or supporting other electrical conductors carrying current in an electrical machine, such as parallel rings, for example. After the start (Block 12), the method includes at Block 14 positioning between the adjacent stator coils 31a, 31b an uncured spacer body 32 that illustratively includes an inner core 34 that may be formed of epoxy glass material and polyester fiber. The polyester fiber may be DACRON, available from E. I. Du Pont De Nemours and Company of Delaware, for example. The core 34 is curable, and may be already cured, or may be uncured. Other core materials may be used as will be appreciated by those skilled in the art.

The uncured spacer body 32 also illustratively includes a curable material 33, such as epoxy resin, for example, that covers the core 34. Other curable materials may be used, such as, for example, other types of curable adhesives. The uncured spacer body 32 also includes an activatable heat generating material 35 mixed in with the curable material 33. The activatable heat generating material 35 may include, for example, a reactive multilayer foil, such as NANOFOIL®, available from Reactive NanoTechnologies Corporation of Delaware, and as discussed in U.S. Pat. No. 6,991,855, the entire contents of which are incorporated herein by reference. Once positioned between adjacent stator coils 31a, 31b, the uncured spacer body 32, including the core 34, curable material 33, and activatable heat generating material 35, and adjacent stator coils are wrapped with glass banding 36 (Block 16).

Figure 3:
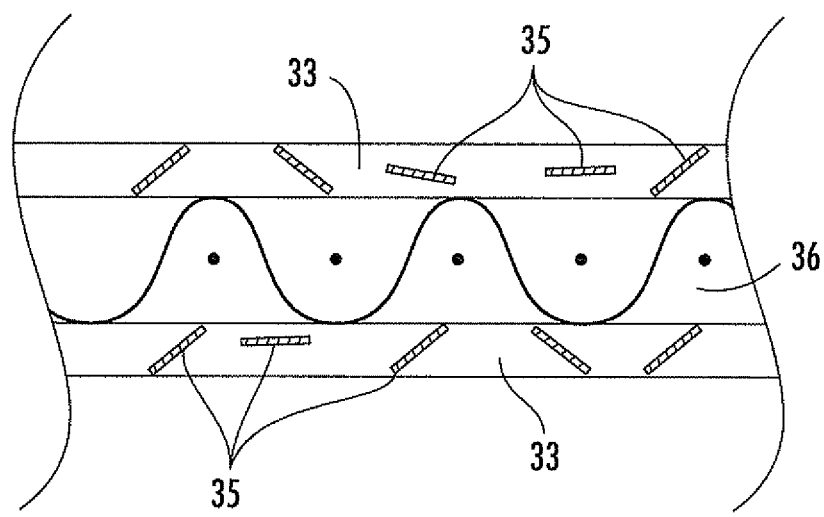
FIG. 3 is a greatly enlarged schematic cross-sectional view of a portion of the banding for the spacer as shown in FIG. 2.

Referring now additionally to FIG. 3, the glass banding 36 is illustratively coated with the curable material 33, and also includes the activatable heat generating material 35. The glass banding 36 will also cure, and advantageously allows further securing of the uncured spacer body 32 between the adjacent stator coils 31a, 31b, as will be appreciated by those skilled in the art.

Once the uncured spacer body 32 is wrapped between the adjacent stator coils 31a, 31b, the activatable heat generating material 35 is activated (Block 18). The activatable heat generating material 35 advantageously provides localized heating of the curable material 33 or epoxy resin to cure, advance the cure, and/or improve the properties of the epoxy resin or curable material to form a cured spacer, and thereby space the adjacent stator coils 31a, 31b in the electrical machine 30 (Block 20). The activatable heat generating material 35 also advantageously remains stable during activation, and reacts internally to generate heat without giving off undesirable by-products.

The additional heat provided by the activatable heat generating material 35 advances the cure closer to the theoretical 100% cure point to thus improve the mechanical properties of the curable material 33. The activatable heat generating material 35 is activated by applying an electric field 37 to the activatable heat generating material in the illustrated embodiment of FIG. 2. The electrical field 37 may be applied by using a pair of electrodes 41a, 41b coupled to a voltage source, or by applying an electric field through the adjacent stator coils 31a, 31b. In other embodiments, a static charge, for example, may be used to activate the activatable heat generating material 35. Activating the activatable heat generating material 35 by applying an electrical field advantageously allows activation of localized heating of the spacer 32 without the use of an oven or other external heating.

Figure 4:
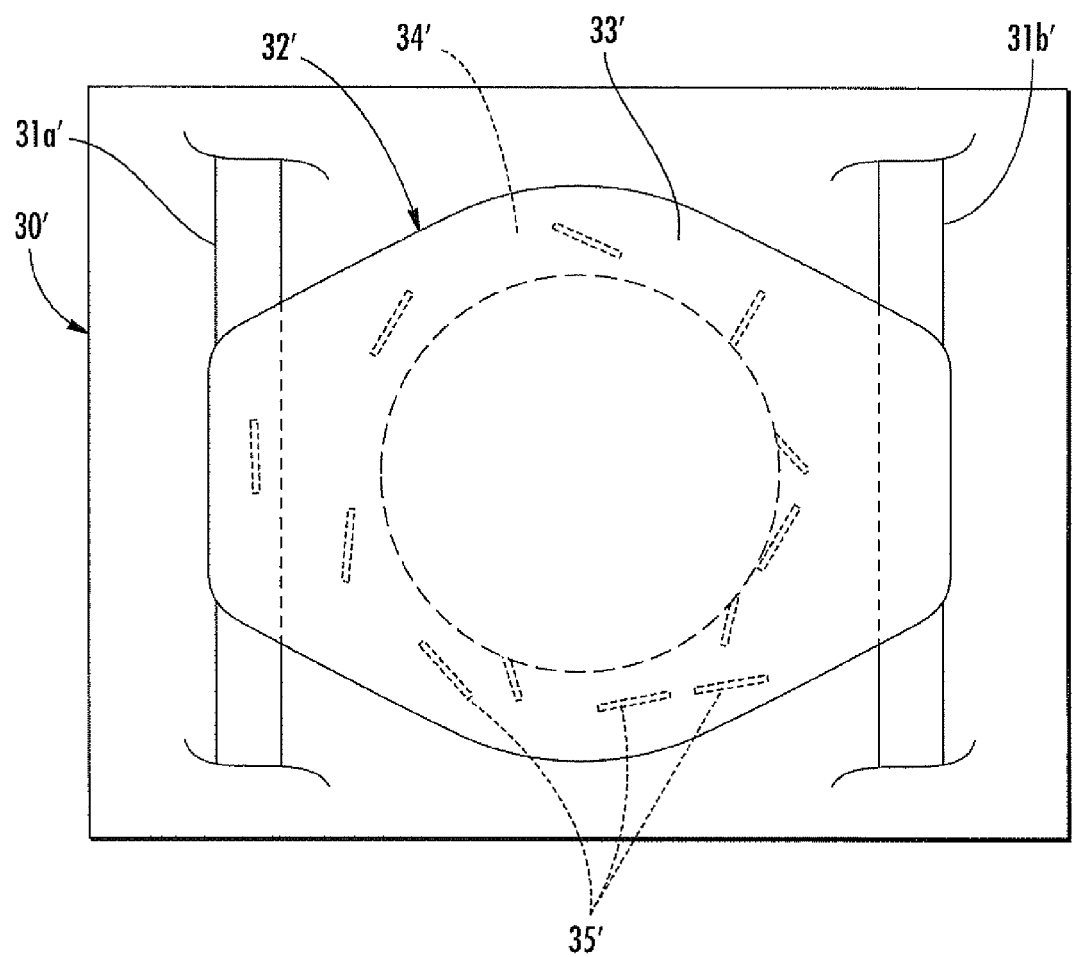
FIG. 4 is a top perspective view of the portion of the electrical machine as shown in FIG. 2 after curing of the spacer.

Referring additionally to FIG. 4, the uncured spacer 32 (FIG. 2) is now cured and defines an insulating spacer 32' for spacing the adjacent stator coils 31a', 31b'. The insulating spacer 32' illustratively includes the cured material 33', and metal portions 35' mixed within the cured material. The metal portions 35' represent residual metal portions from the activatable heat generating material 35 (FIG. 2) as will be appreciated by those skilled in the art. The now cured insulating banding 36' is illustratively around the adjacent stator coils 31a', 31b' and the insulating spacer 32'.

Figure 5:
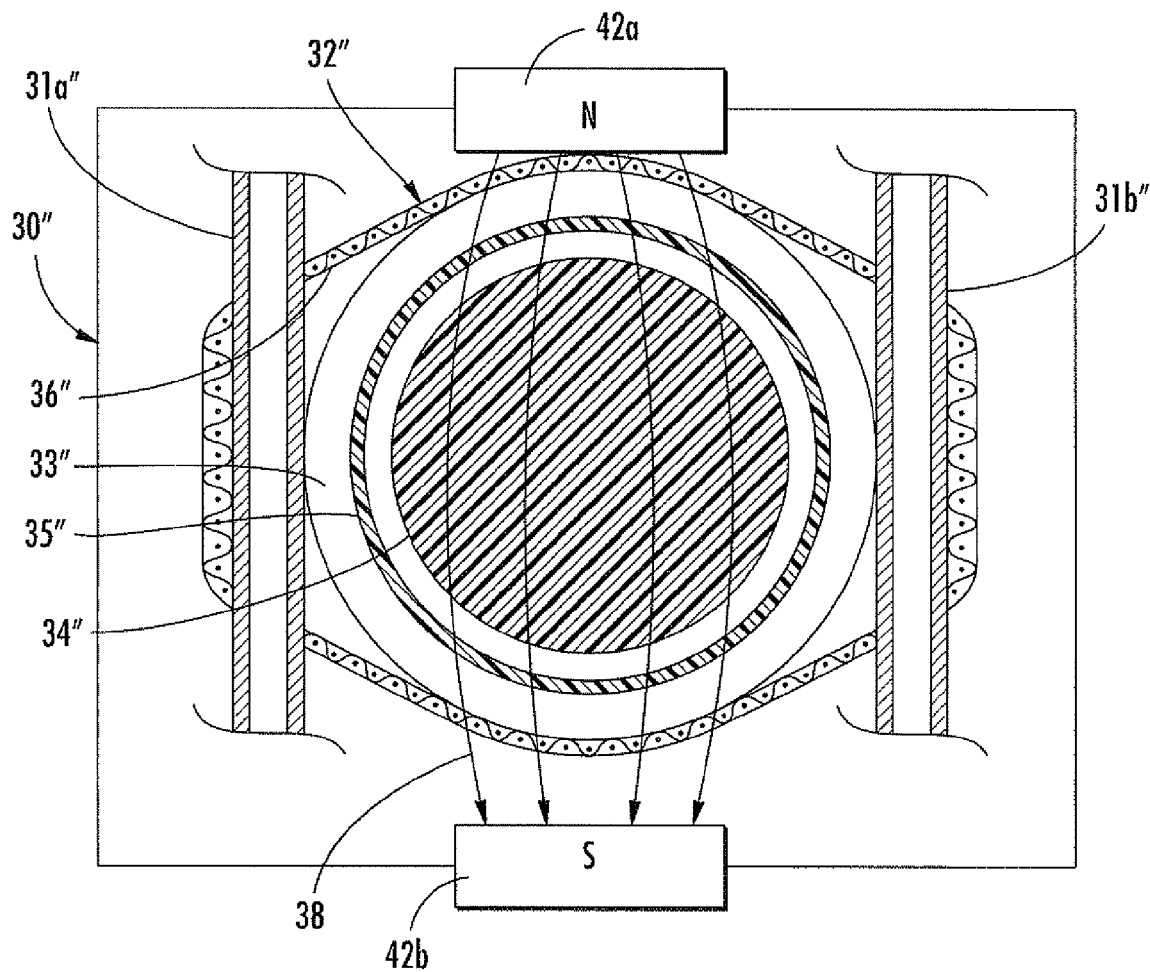
FIG. 5 is a schematic cross-sectional view of a portion of an electrical machine including an uncured spacer body and associated banding for spacing in accordance with another embodiment of the method of FIG. 1.

Turning now to the electrical machine 30" embodiment of FIG. 5, the activatable heat generating material 35" is illustratively included as a strip within the curable material 33". Other shapes and configurations of the activatable heat generating material 35" will be appreciated by those skilled in the art. Further, the activatable heat generating material 35" in this embodiment is activated by applying a magnetic field 38 to the activatable heat generating material. Magnets 42a, 42b may temporarily be positioned opposite each other to create a magnetic field through the spacer 32". In some embodiments, the magnets 42a, 42b may be electro-magnets to allow pulsing of the magnetic field. Activating the activatable heat generating material 35" by applying a magnetic field also advantageously allows activation of localized heating of the spacer 32" without the use of an oven or other external heating. Still, in other embodiments, the activatable heat generating material 35" may be activated by other activating methods, such as a spark, for example, as will be appreciated by those skilled in the art.

In the illustrated electrical machines the current carrying electrical conductors are in the form of stator coils, however, those of skill in the art will recognize that the methods and devices disclosed herein are applicable to other current carrying electrical conductors. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method of spacing a plurality of electrical conductors for carrying current in an electrical machine comprising:
    positioning between the electrical conductors an uncured spacer body comprising;
    a curable material, and
    an activatable heat generating material mixed with the curable material; and
    activating the activatable heat generating material to heat the curable material to form a cured spacer to thereby space the electrical conductors in the electrical machine, wherein the activatable heat generating material is activatable by an applied electric field and wherein activating the heat generating material includes applying an electric field to the activatable heat generating material.

2. The method according to claim 1 wherein the electrical conductors comprise adjacent coils.

3. The method according to claim 1 wherein the activatable heat generating material comprises a multilayer reactive foil.

4. The method according to claim 1 wherein the curable material comprises an epoxy resin.

5. The method according to claim 1 wherein the uncured spacer body further comprises a core within the curable material and activatable heat generating material.

6. The method according to claim 1 further comprising wrapping the uncured spacer body between the electrical conductors prior to activating.

7. A method of spacing a plurality of electrical conductors for carrying current in an electrical machine comprising:
    positioning between the electrical conductors an uncured spacer body comprising;
    an epoxy resin, and
    a multilayer reactive foil mixed with the epoxy resin; and activating the multilayer reactive foil to heat and cure the epoxy resin to form a cured spacer to thereby space the electrical conductors in the electrical machine.

8. The method according to claim 7 wherein the electrical conductors comprise adjacent coils.

9. The method according to claim 7 wherein the multilayer reactive foil is activatable by an applied electric field; and wherein activating comprises applying an electric field to the multilayer reactive foil.

10. The method according to claim 7 wherein the multilayer reactive foil is activatable by an applied magnetic field; and wherein activating comprises applying a magnetic field to the multilayer reactive foil.

11. The method according to claim 7 wherein the multiplayer foil is activatable by an applied static charge; and wherein activating comprises applying a static charge to the multiplayer reactive foil.

12. The method according to claim 7 wherein the uncured spacer body further comprises a core within the epoxy resin and multilayer reactive foil.

13. The method according to claim 7 further comprising wrapping the uncured spacer body between the electrical conductors prior to activating.

* * * * *